United States Patent [19]
Jensen

[11] Patent Number: 5,956,043
[45] Date of Patent: Sep. 21, 1999

[54] TEXTURED TILE ROTATION SYSTEM AND METHOD

[75] Inventor: Del Jensen, Orem, Utah

[73] Assignee: Novell, Inc., Provo, Utah

[21] Appl. No.: 08/933,231

[22] Filed: Sep. 18, 1997

[51] Int. Cl.⁶ .................................................. G06T 3/60
[52] U.S. Cl. ......................... 345/430; 345/430; 345/437; 345/439
[58] Field of Search ................................ 345/430, 437, 345/439

[56] References Cited

U.S. PATENT DOCUMENTS

| | | | |
|---|---|---|---|
| 4,615,013 | 9/1986 | Yan et al. | 345/430 |
| 4,930,088 | 5/1990 | Horiguchi | 364/518 |
| 5,067,167 | 11/1991 | Berger | 382/46 |
| 5,295,237 | 3/1994 | Park | 395/137 |
| 5,295,245 | 3/1994 | Alcorn et al. | 395/164 |
| 5,319,744 | 6/1994 | Kelly et al. | 395/136 |
| 5,412,768 | 5/1995 | Ozaki | 395/137 |
| 5,446,833 | 8/1995 | Miller et al. | 395/125 |
| 5,469,535 | 11/1995 | Jarvis et al. | 395/130 |
| 5,490,240 | 2/1996 | Foran et al. | 395/130 |
| 5,537,224 | 7/1996 | Suzuoki e tal. | 358/462 |
| 5,550,960 | 8/1996 | Shirman et al. | 395/130 |
| 5,553,208 | 9/1996 | Murata et al. | 395/125 |
| 5,561,746 | 10/1996 | Murata et al. | 395/119 |
| 5,561,756 | 10/1996 | Miller et al. | 395/155 |
| 5,568,600 | 10/1996 | Kaba | 395/137 |
| 5,751,293 | 5/1998 | Hashimoto et al. | 345/430 |
| 5,877,771 | 3/1999 | Drebin et al. | 345/430 |

OTHER PUBLICATIONS

"Bug: Mental Ray Cannot Perform 2D Local Texture Rotations", Anon., http:/www.microsoft.com/kb/articles/q149/7/32.htm, no later than Jan. 9, 1997, 2 pp.

"Background", found in the book "Digital Image Warping", G. Wolberg, *IEEE*, 1990, pages unknown.
"Bump Mapping", found in the book "Photorealism and Ray Tracing in C", C. D. Watkins et al., *M&T Books*, 1992, pages unknown.
"Fast Geometrical Manipulations of Digital Images", C. Braccini et al., *Computer Graphics and Image Proceesing 13*, 1980, pp. 127–141.
"Mapping Textures Made Easy" found in the book "The Zen of Graphics Programming", M. Abrash, *Coriolis Group Books*, 1994, pages unknown.
"Perspective Mapping of Planar Testures", M. Gangnet et al., *Computers and Graphics, (Pergamon), v.8 n.2*, 1984, pp. 115–123.
"Planar 2–Pass Texture Mapping and Warping", A.R. Smith, *Computer Graphics*, vol. 21, No. 4, Jul. 1987, pp. 263–271.
"Texture, Texture, Texture", found in the book "Photorealism and Ray Tracing in C", C. D. Watkins et al., *M&T Books*, 1992, page unknown.
"3–D Transformations of Images in Scanline Order", E. Catmull et al., *ACM*, 1980, pp. 279–285.
"Selected Abstracts", No later than Feb. 4, 1996.

*Primary Examiner*—Mark R. Powell
*Assistant Examiner*—Kimbinh T. Nguyen
*Attorney, Agent, or Firm*—Computer Law++

[57] ABSTRACT

Methods and systems are provided for producing a rotated textured tile on a display device. An unrotated textured tile is identified. A supertile that contains repeated adjacent copies of at least part of the unrotated tile is produced. The supertile is rotated through an arbitrary angle. A period in X and a period in Y are selected. To select a period, a pixel-wide window is moved along the axis, and pixels in the window are measured against pixels in a reference location until a match of acceptable accuracy is found. If no match is found then one or more parameters are perturbed and the sliding-comparison process repeats.

32 Claims, 12 Drawing Sheets

TEXTURED TILE ROTATION SYSTEM AND METHOD

FIELD OF THE INVENTION

The present invention relates to computer graphics, and more particularly to seamless tiling using rotated textures.

TECHNICAL BACKGROUND OF THE INVENTION

When creating an image for display on a computer screen or other display, it is often desirable to use a "texture" (sometimes referred to as a "pattern" or "wallpaper"). For instance, shapes created in a drawing program on a personal computer or workstation may be filled with textures that depict bricks, waves, scales, or other images. Likewise, many personal computers display a textured desktop as the default background screen.

To reduce the storage space required when using textures, and to make the application of textures to objects faster, textures may be "tiled." Tiling includes taking a defined texture region (known as a "tile") such as a textured rectangle, and stamping out repeated adjacent copies of the tile to cover a surface region. Tiling is preferably "seamless" in that the borders between tiles are difficult or impossible to see. Copies of a tile can be placed on a computer display very rapidly, and a single copy of a tile often fits in a small piece of computer memory.

Textures come in many varieties, including without limitation visual textures, bump maps, and masks. Visual textures contain pixel values which are displayed directly on a screen. Screen backgrounds and fill patterns in drawing programs are some of the many examples of visual textures.

Bump maps help distort the smooth surface of an object with apparent bumps or ripples. Bump maps may be used to efficiently produce a surface that appears three-dimensional but is actually modeled internally in a simpler two-dimensional form. One type of bump map produces a pebbly surface, another type gives a cloth-like appearance, and there are many others as well.

A mask is a region with "holes" that specify which pixels will be drawn and which will be suppressed or altered. A mask may be used when drawing one object behind another object, so the apparently closer object hides the apparently distant one. A mask can also be used to composite an image of a meteorologist over an image of a weather map to make it appear as though the meteorologist is standing in front of a large weather map when, in fact, the meteorologist is standing in front of a large blue screen and the map is on a standard video monitor.

Each type of texture may be either bit-mapped or procedural. Bit-mapped textures store the value of each pixel of a given tile. Bit-mapped textures thus require an amount of storage that increases each time additional pixels are added. By contrast, procedural textures define pixel values according to a formula, which may include a random element.

Bitmaps are useful when a formula defining pixel values is unknown or does not exist. For example, a texture representing the Mona Lisa would be bit-mapped. Bitmaps may also be used when the time needed to calculate pixel values with a formula is too great. Procedural textures are sometimes preferred because they require less space than bitmaps. Bump maps are often procedural, using formulas to define distortions that resemble three-dimensional textures such as cloth or leather. The storage required by a procedural texture is generally independent of the number of pixels defined, since a formula is used rather than individual pixel values.

It is often desirable to rotate a texture. For instance, a textured region may be rotated by a graphic designer or by an animator. Unfortunately, conventional methods for rotating textures have serious drawbacks.

Figure 1:
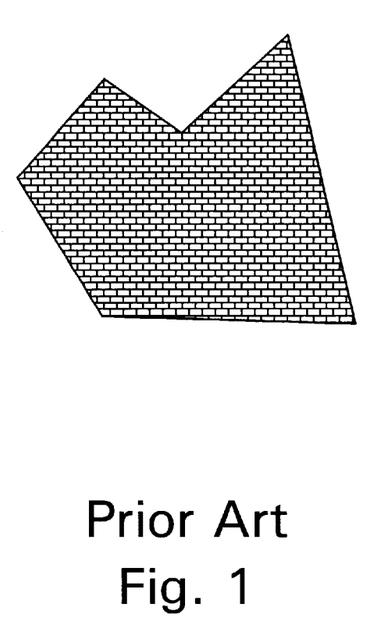
FIG. 1 shows a region defined by a border surrounding a visual texture.
Figure 2:
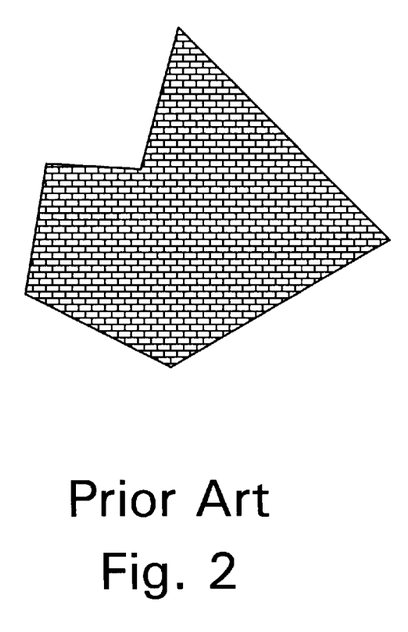
FIG. 2 shows the result of a conventional method which rotates only the border of the region shown in FIG. 1.

Some approaches fail completely to rotate textures. One such approach simply prevents all rotations. Another approach, illustrated in FIGS. 1 and 2, only rotates the border of a region, without any corresponding rotation of the enclosed texture. FIG. 1 shows a region enclosing a brick texture; FIG. 2 shows the same region after the border alone has been rotated.

Failure to rotate the texture and the border together leads to unrealistic images. For example, suppose an animation displays a cart carrying a load of bricks, with the load defined as a region containing a brick-pattern texture. As the cart begins climbing a hill, the outline of the bricks will rotate but the lines depicting individual bricks will not. This approach is relatively easy to implement, but often unsatisfactory. Viewers expect entire objects to rotate, not just their borders. Nonetheless, this method is used by drawing routines in currently popular computer programs.

Figure 3:
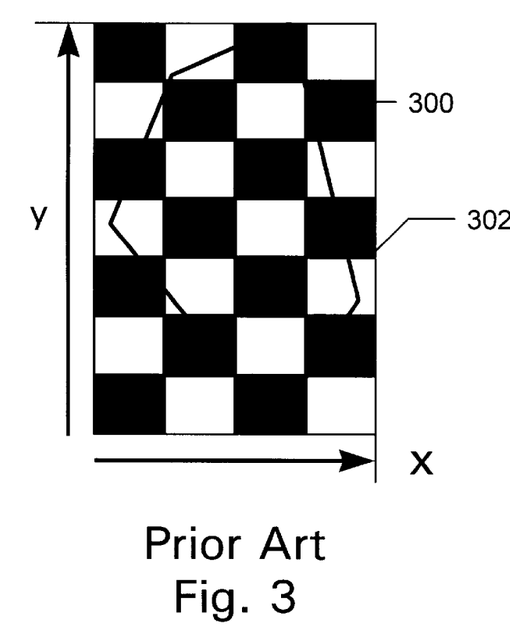
FIG. 3 shows a region border superimposed on a conventional texture rectangle that was created by stamping out copies of an unrotated texture tile.
Figure 4:
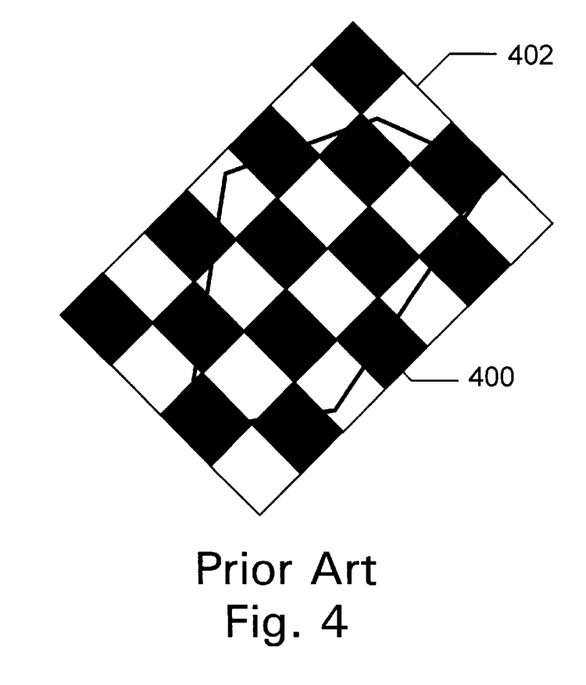
FIG. 4 shows a rotated region border and a rotated texture rectangle that were produced by conventional rotation of the border and rectangle of FIG. 3.
Figure 5:
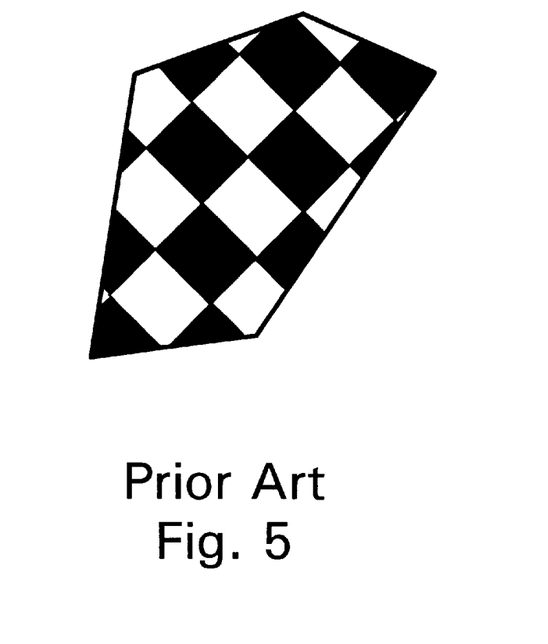
FIG. 5 shows the result after a conventional clipping operation on the rotated texture rectangle and rotated region border of FIG. 4.
Figure 6:
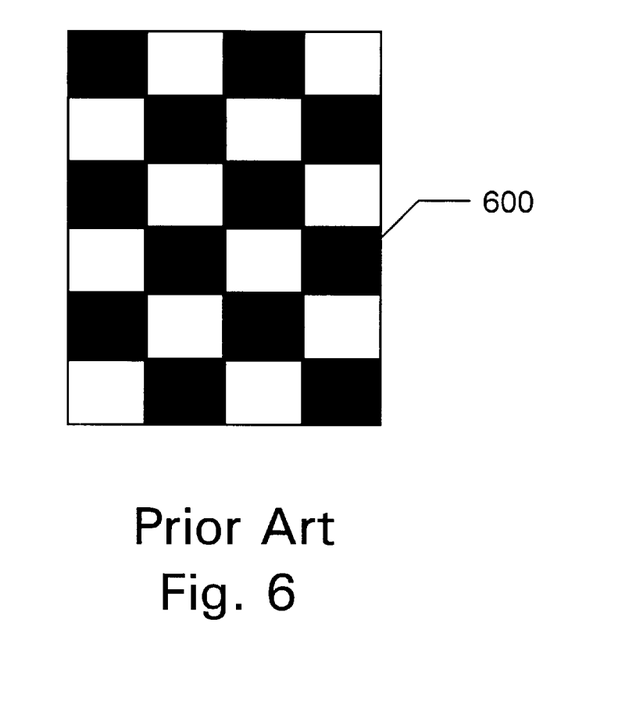
FIG. 6 shows a conventional unrotated texture tile.
Figure 7:
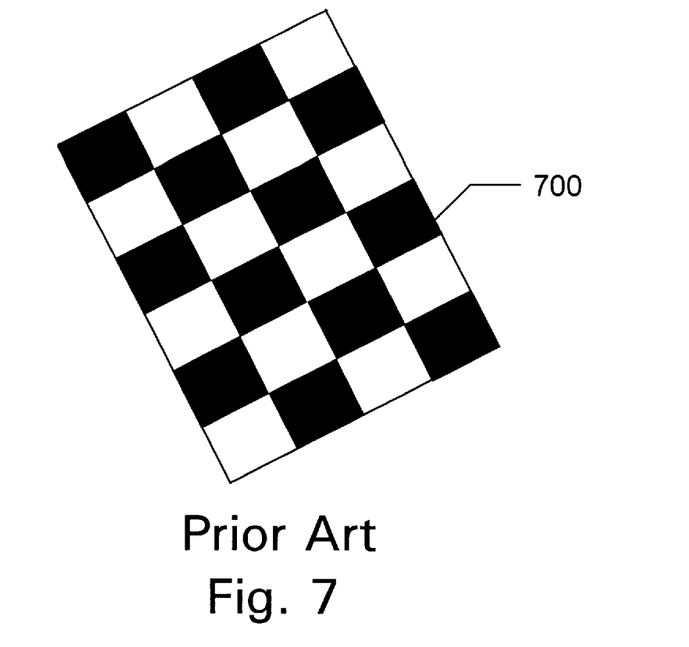
FIG. 7 shows a rotated texture tile produced by conventional rotation of the tile shown in FIG. 6.

A slightly better method is shown in FIGS. 3, 4, and 5. This approach rotates the texture by building and rotating a texture rectangle large enough to cover the entire rotated region. For clarity of illustration, a visual checkerboard texture is used, but the methods described also apply to other textures. First, the size of an unrotated region border 300 is measured in the X and Y directions, as shown in FIG. 3. Then a small texture tile (containing a texture that has not been rotated) is used to create a texture rectangle 302 large enough to cover the rotated region after the rectangle 302 is itself rotated.

As shown in FIG. 4, the region border 300 is rotated to obtain a rotated border 400. In addition, the entire texture rectangle 302 is rotated to produce a rotated rectangle 402. Rotation of the entire texture rectangle 302 to obtain the rectangle 402 may include significant computational effort. Finally, the rotated texture rectangle 402 is clipped. That is, portions of the rectangle 402 outside the rotated border 400 are discarded, producing the result shown in FIG. 5. This approach succeeds in seamlessly texturing an arbitrarily-sized rotated region only at the cost of creating, and then rotating, each and every pixel in the oversize rotated textured region, including many pixels that are clipped off and thus never really needed.

Another method is shown in FIGS. 6 through 9. This approach rotates a relatively small original texture tile 600 to produce a rotated tile 700 and then cuts an even smaller subtile 800 out of the rotated tile 700. The subtile 800 has vertically and horizontally aligned borders to facilitate stamping, clipping, and other computer graphics operations. Copies of the rotated subtile 800 are used to fill a rotated region border 902. A benefit of this approach is that many fewer computations are needed to rotate the texture, and fewer pixels are typically discarded when the texture is clipped to lie within the rotated border.

Figure 8:
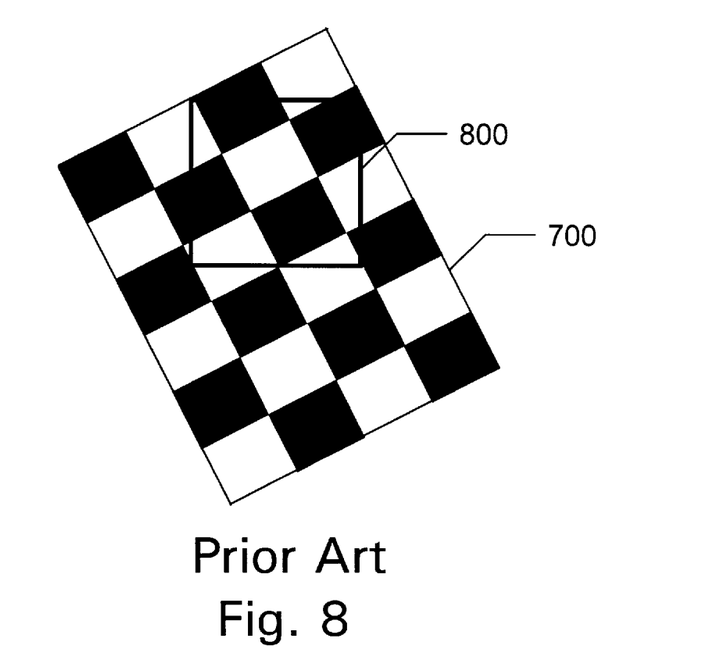
FIG. 8 shows a vertically and horizontally aligned subtile being cut by a conventional method from the rotated texture tile of FIG. 7.
Figure 9:
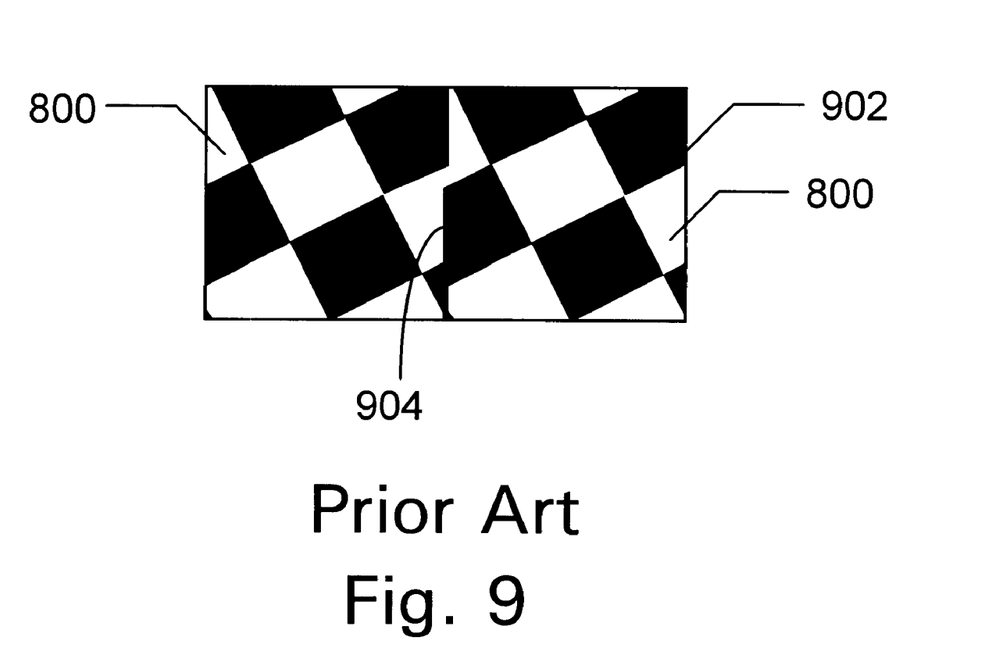
FIG. 9 shows a seam produced when the subtile of FIG. 8 is used to fill a region.

Unfortunately, a subtile cut in this way from within the rotated texture tile will often not seamlessly tile a region. That is, the tile boundaries will be apparent (as shown at 904 in FIG. 9) because pixel values do not vary across the border between two copies of the rotated subtile 800 in the same way that pixel values vary across the border of adjacent copies of the original unrotated tile 600.

Thus, it would be an improvement in the art to provide a method which, given a texture tile and a region defined by a border, produces a relatively small tile that contains the rotated texture and will seamlessly tile the region.

It would be a further advance if the method were useful with both bit-mapped and procedural textures, and with different varieties of texture such as visual textures, bump maps, and masks.

Such a method and system for texture rotation and seamless tiling are disclosed and claimed herein.

BRIEF SUMMARY OF THE INVENTION

Methods and systems are provided for producing a rotated textured tile on a display device using a technique that conserves computer resources such as computational cycles and memory space. According to one method of the invention, an unrotated textured tile is identified. A supertile that contains repeated adjacent copies of at least part of the unrotated tile is produced. The supertile is rotated through a desired angle. A "period" in X and a possibly different "period" in Y are selected, and are then used to define a subtile of the rotated supertile which will provide a specified degree of seamless tiling.

One method for selecting a period slides a long, narrow window along an axis, starting at an initial offset from one end of the rotated supertile's intersection with the axis, and moving to successive positions one slide increment at a time until a chosen metric determines that the pixels under the window's current location differ from those at a reference position by less than a specified tolerance. The metric measures the difference in appearance for visual textures, and measures analogous qualities of other textures. If the "seamlessness" difference measured by the metric is small enough, then the distance in pixels traveled by the window from the reference position is the period. If no match is found by the time the window reaches the opposite side of the rotated supertile, then one or more modifications are made and the process repeats until a period is determined. Modifications may perturb the rotational orientation of the rotated supertile, change the tolerance, enlarge the supertile, change sampling or interpolation techniques, or make other changes to the rotated supertile, the window, or the metric.

When the period has been found in one axis the process is repeated in the other axis. When the period has been found in both axes the least common multiple of the two periods is calculated. Then a textured tile with an X-length and a Y-length of the least common multiple is produced. This seamlessly tiling rotated texture or a portion thereof is then displayed on a computer display.

Unlike conventional methods, the present invention does not require calculation and rotation of every pixel in the supertile. Only pixels along the axes (and pixels used to produce axis pixels by interpolation), and pixels in the final rotated tile defined by the periods must be obtained and rotated. This is generally a small fraction of the total number of pixels in the supertile. Use of the invention can provide substantially faster texture rotation and reduced storage requirements. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a method and apparatus for seamlessly tiling a rotated texture on a computer. The computer may be part of a computer network, an embedded system, or another computer system. Computers which may be configured according to the invention include mainframes, and computers on local networks, wide area networks, and/or the Internet. "Internet" as used herein includes variations such as a private Internet, a secure Internet, a portion of the Internet such as the World Wide Web, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 10:
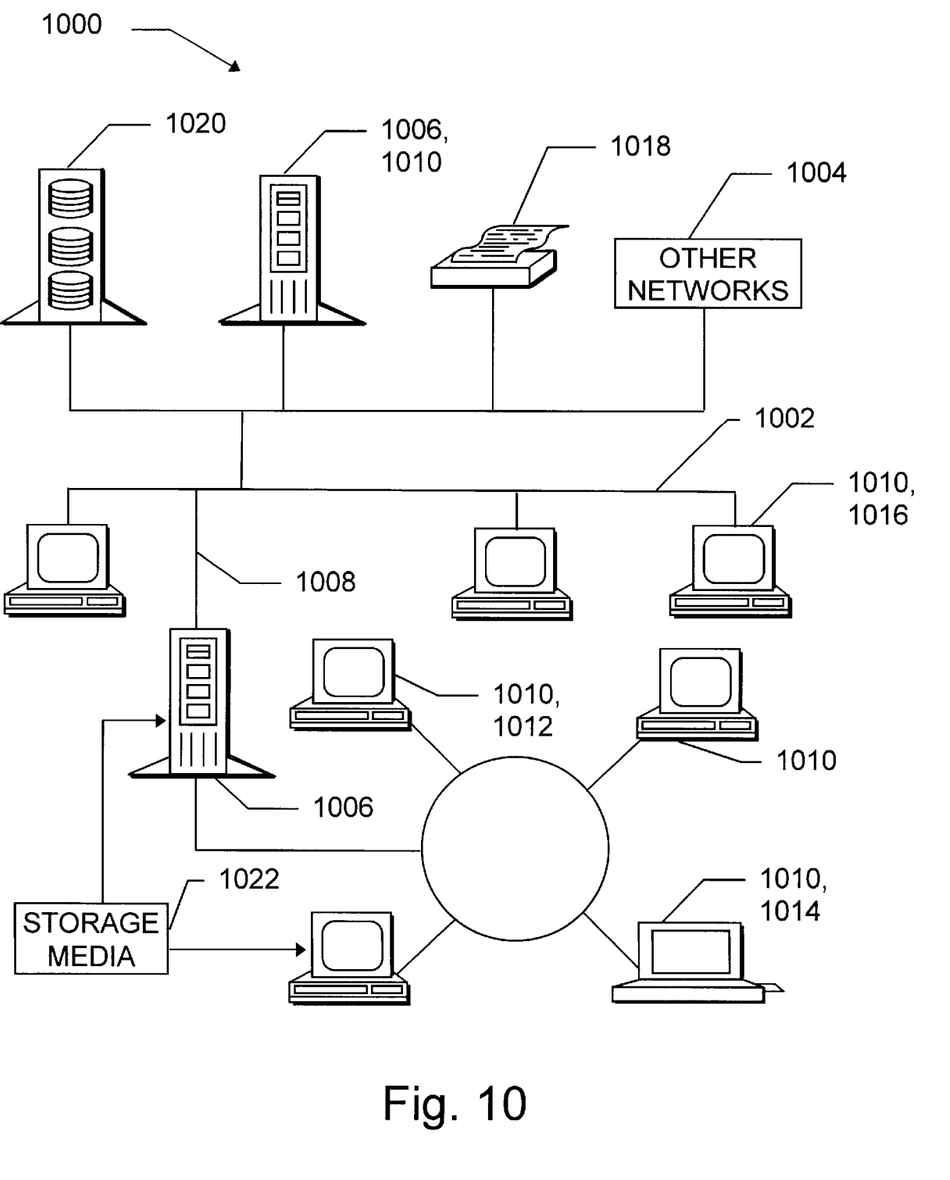
FIG. 10 is a diagram illustrating computers which may be used individually or in a combined system to perform texture rotation and other computer graphics operations according to the present invention.

One of the many computer networked systems suited for use with the present invention is indicated generally at 1000 in FIG. 10. In one embodiment, the system 1000 includes Novell NetWare® network operating system software (NETWARE is a registered trademark of Novell, Inc.). In alternative embodiments, the system 1000 includes NetWare Connect Services, VINES, Windows NT, Windows 95, LAN Manager, or LANtastic network operating system software (VINES is a trademark of Banyan Systems; NT, WINDOWS 95, and LAN MANAGER are trademarks of Microsoft Corporation; LANTASTIC is a trademark of Artisoft). The system 1000 may include a local area network 1002 which is connectable to other networks 1004, including other LANs or portions of the Internet or an intranet, through a gateway or similar mechanism. Stand-alone computers, or computers comprising a mainframe with either smart or dumb terminals, may also be used.

The system 1000 includes several file servers 1006 that are connected by network signal lines 1008 to one or more network clients 1010. The file servers 1006 and network clients 1010 may be configured individually or in combination by those of skill in the art in a wide variety of ways to operate according to the present invention. The file servers 1006 may be configured as Internet servers, as intranet servers, as directory service providers or name servers, as software component servers, distributed memory or processing unit, or as a combination thereof. The servers 1006 may be uniprocessor or multiprocessor machines. The servers 1006 and clients 1010 each include an addressable storage medium such as random access memory and/or a non-volatile storage medium such as a magnetic or optical disk.

Suitable network clients 1010 include, without limitation, personal computers 1012, laptops 1014, workstations 1016, and dumb terminals. The signal lines 1008 may include twisted pair, coaxial, or optical fiber cables, telephone lines, satellites, microwave relays, modulated AC power lines, and other data transmission "wires" known to those of skill in the art. In addition to the network client computers 1010, a printer 1018 and an array of disks 1020 are also part of the illustrated system 1000.

A given computer may function both as a client 1010 and as a server 1006; this may occur, for instance, on computers running Microsoft Windows NT software or in peer-to-peer networks. Although particular individual and network computer systems and components are shown, those of skill in the art will appreciate that the present invention also works with a variety of other networks and computers.

The file servers 1006 and the network clients 1010 are capable of using floppy drives, tape drives, optical drives or other means to read a storage medium 1022. A suitable storage medium 1022 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 1022 tangibly embodies a program, functions, and/or instructions that are executable by the file servers 1006 and/or network client computers 1010 to perform texture tile rotation and usage steps of the present invention substantially as described herein.

As noted above, methods currently used to tile rotated regions have serious drawbacks. To overcome limitations imposed by conventional rotation and tiling methods, the present invention provides methods to rotate and seamlessly tile a texture. The methods may be embodied in any suitable system such as the system 1000 (FIG. 10) or the individual computers 1006, 1010, 1012, 1014, 1016, using a combination of computer hardware and software. Suitable software is readily provided by those of skill in the art using the teachings presented here and programming languages such as Java, Pascal, C++, C, assembly, firmware, microcode, and/or other languages.

One method of the current invention for seamlessly tiling a rotated texture is illustrated generally in FIGS. 11–14. During an obtaining step 1102, an unrotated textured tile is identified. Suitable textures include visual textures, bump maps, masks, bitmap textures, procedural textures and other textures familiar to those of skill in the art. The texture may be obtained from a wide variety of sources, including without limitation: generating the texture using a formula, pulling it from memory, obtaining it from an outside vendor, pulling it off the Internet, digitizing an image, and so on. Although texture tiling is often done in gray-scale, the present invention may also be used to manipulate multidimensional or color textures. Moreover, the invention may be used with either static or animated images. Indeed, the benefits may be greater with animation, because problems associated with rotating textures tend to be more pronounced in animation; rapid computation and compact storage are often important when producing a rapid succession of images.

Figure 12:
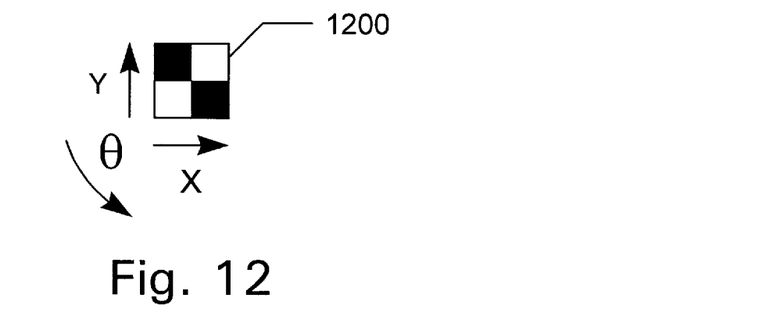
FIG. 12 shows an unrotated texture tile suitable for use with the present invention.

For purposes of illustration, assume that the obtained textured tile is the two-by-two checkerboard tile 1200 shown in FIG. 12. The tile 1200 has an initial rotation indicated in FIG. 12 as θ (theta), and a length along each of two axes, as indicated by the letters "X" and "Y". For convenience, theta may be treated as a baseline orientation which represents a rotation of zero units (degrees, radians, . . . ). Although the standard right-angled X-axis and Y-axis will typically be used, other independent (non-collinear and/or non-planar) axes may also be used according to the invention.

During a creating step 1104, at least a portion of a rotated supertile 1400 (FIG. 14) is produced from the tile 1200. A supertile 1300 (FIG. 13), or at least the necessary portion thereof, may be readily produced by stamping out repeated adjacent copies of the tile 1200. One method generates a supertile 1300 containing one copy of the entire tile 1200 for each pixel in the tile 1200. Other methods may also be used, including iterative methods that produce a succession of supertiles 1300 until one is satisfactory. The necessary portion of the supertile 1300 is that portion which will lie on the axes shown in FIG. 14. At least this necessary portion of the supertile 1300 is then rotated through an angle Δ (delta), producing at least the necessary portion of the rotated supertile 1400.

Figure 13:
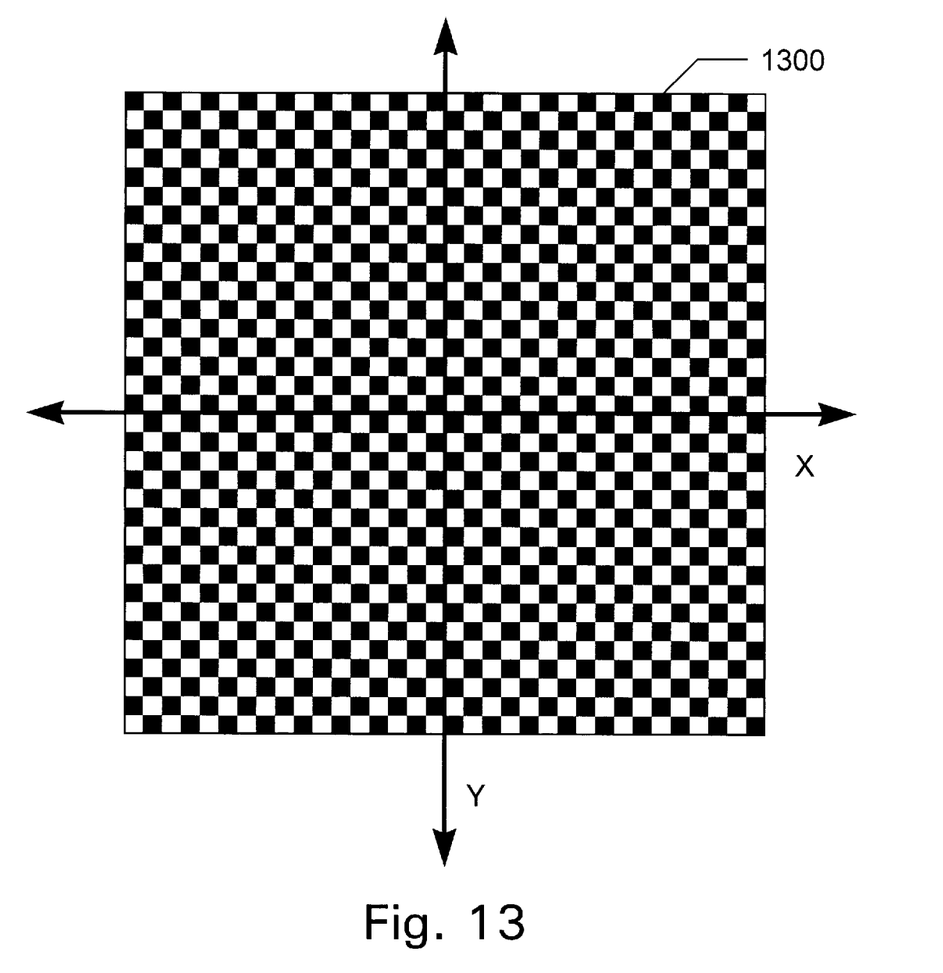
FIG. 13 shows a supertile created from the tile of FIG. 12 according to the invention.

Advantageously, although the present invention may use the entire supertile 1300 and the entire rotated supertile 1400, it need not do so. Significant computation may be avoided by only computing the necessary portions of the supertiles 1300, 1400, namely, those portions which are needed to find the values of pixels in the rotated supertile 1400 that lie on the X-axis and Y-axis in FIG. 14.

Returning to FIG. 11, an X-period and a Y-period are selected during a selecting step 1106. The X-period represents the distance along the X-axis in FIG. 14 after which values of the necessary portion of the rotated supertile 1400 begin to repeat; the Y-period represents a similar distance along the Y-axis. In general, the periods are not exact, in that the repetition of pixel values may be approximate. However, the invention provides several steps for measuring the sufficiency of a candidate period and for improving the accuracy of a period to provide better seamlessness. Period selection is discussed in more detail in connection with FIGS. 15 through 19.

Figure 14:
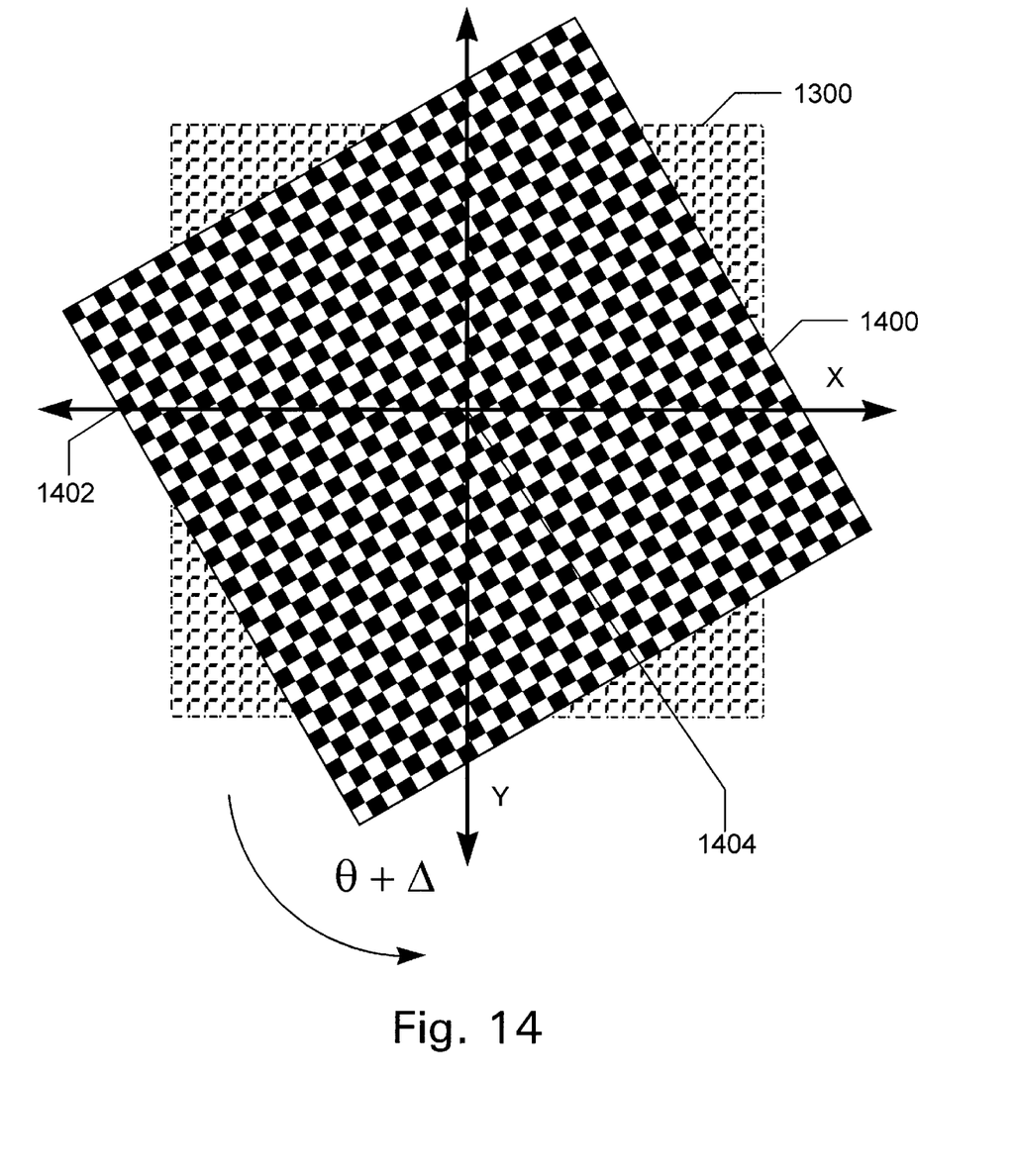
FIG. 14 shows a rotated supertile created from the supertile of FIG. 13 according to the invention.

During a producing step 1108, a rotated textured tile is generated using the X-period, the Y-period, and a portion of the rotated supertile 1400. Like the original unrotated tile 1200, the rotated textured tile is aligned at a rotation of theta units to facilitate stamping, clipping, texture mapping, and other computer graphics operations. Like the unrotated tile 1200, the rotated textured tile tends to be much smaller than large screen regions such as the desktop. The rotated textured tile also permits seamless tiling, at least to the degree of accuracy of the selected X-period and Y-period. Unlike the original unrotated tile 1200, however, the rotated textured tile contains a texture which has been rotated an additional delta units. The producing step 1108 is described in greater detail below.

During a step 1110 at least a portion of the rotated textured tile is displayed or otherwise used. The texture can be displayed or used in any of a variety of ways, including without limitation: storing the texture on disk, transmitting a file containing the texture across a network, displaying the texture on a computer screen, or storing the texture in local memory for later display or use in computer graphics operations.

Figure 11:
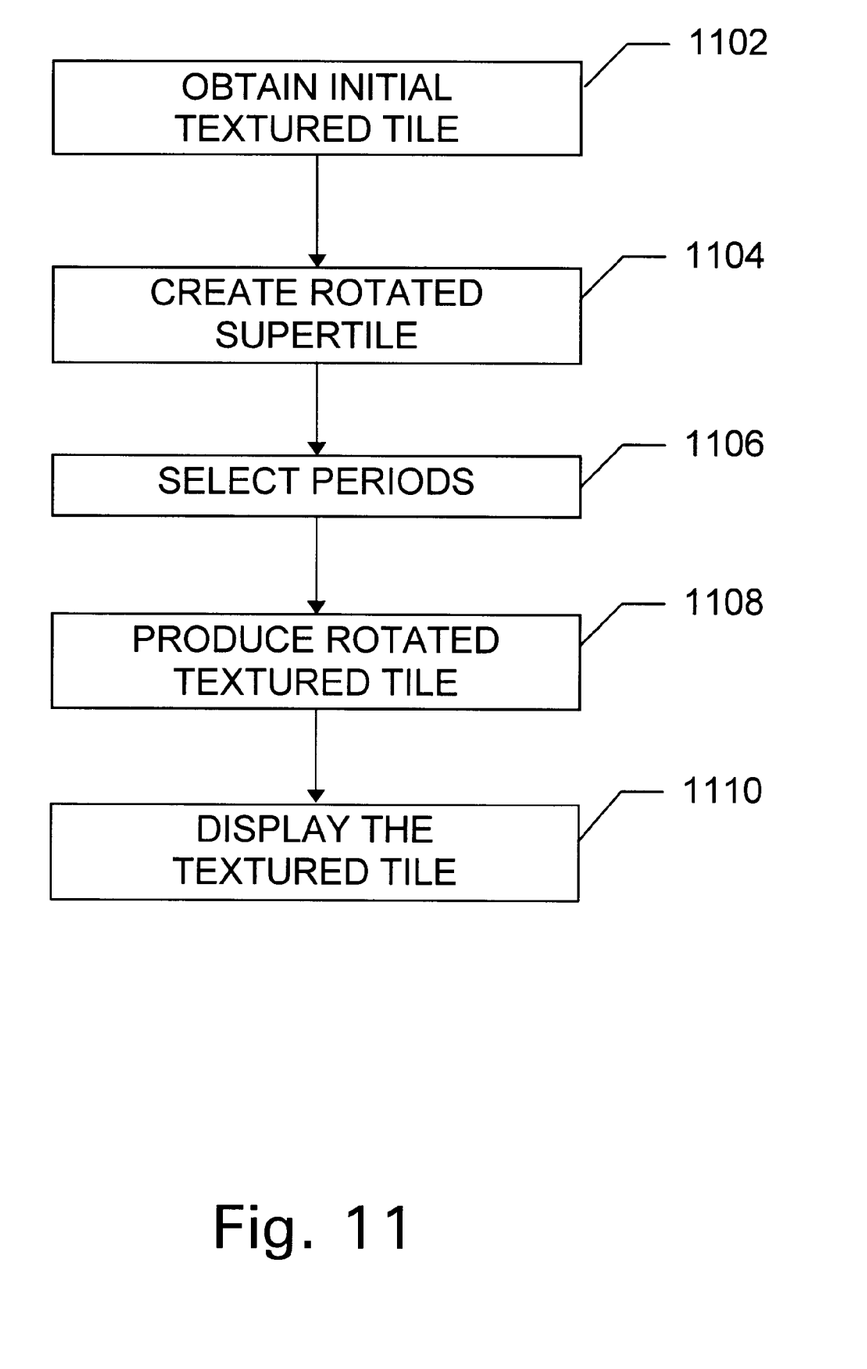
FIG. 11 is a flowchart illustrating a method of the present invention.
Figure 15:
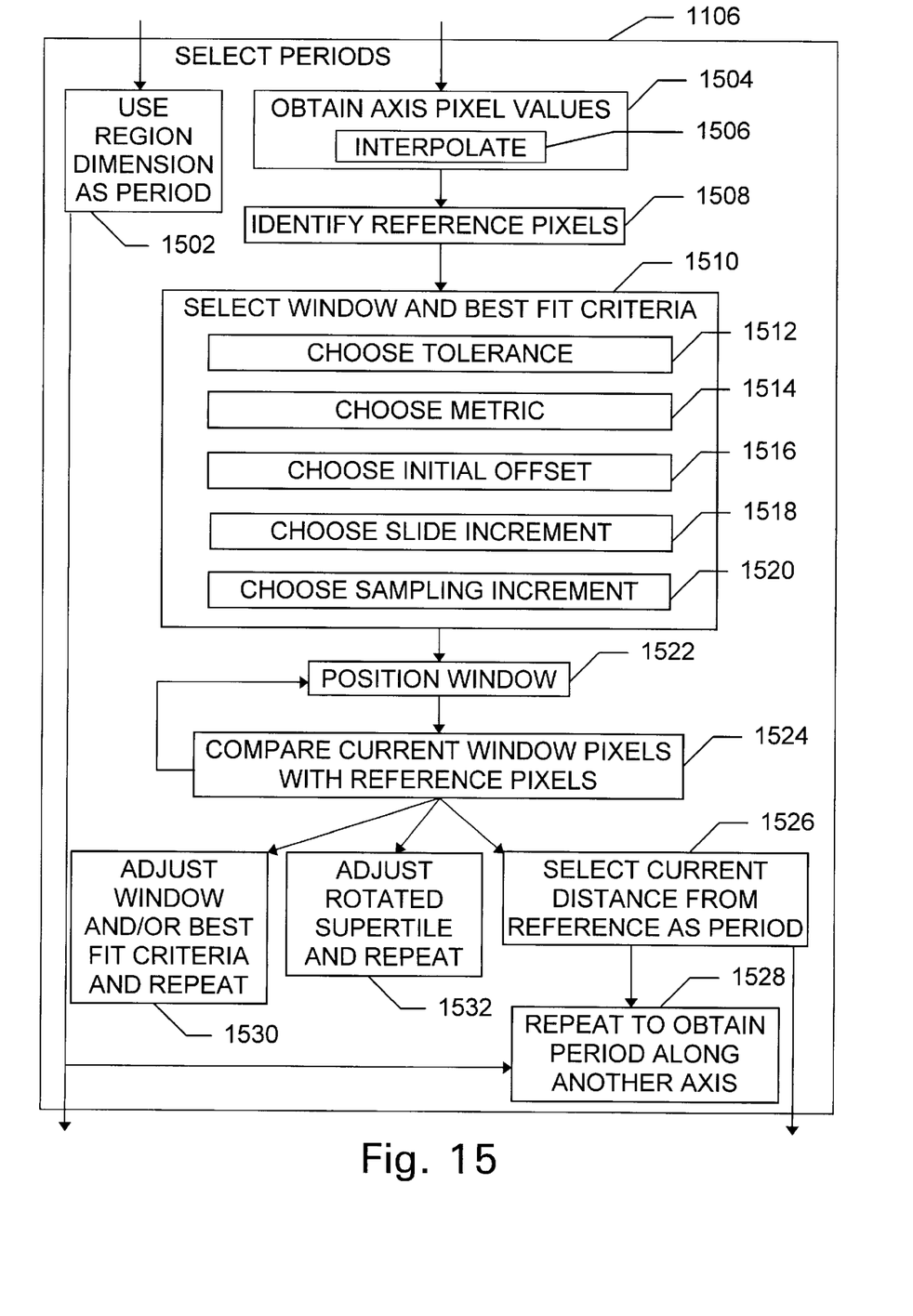
FIG. 15 is a flowchart further illustrating the selection of periods according to the present invention.

FIG. 15 illustrates in greater detail one approach to the period selecting step 1106 of FIG. 11. In many cases, a period will be selected along each of two independent axes, and the rotated texture tile produced by the invention will be smaller in both directions than the desktop or other display region. However, the invention may also be used to select a period along only one axis. For instance, the user may wish to stamp out a single row (or column) of long narrow tiles, making seamlessness an issue in only one direction. In this case, the dimension of the desktop or other region along the other axis may be selected as a default period during a step 1502. The period along the other axis is then determined using the steps that begin at step 1504. If step 1502 is not used, both periods are determined by successive passes through the steps beginning at step 1504.

During the pixel obtaining step 1504, pixel values along a selected axis (typically the X-axis or Y-axis) in the necessary portion of the rotated supertile 1400 are obtained by reading from a bitmap, invoking a procedural texture definition, scanning an image, or other means. It may happen that no single pixel value in the rotated supertile 1400 lies exactly on the desired sample point along the axis. However, familiar interpolation techniques may be used during an interpolating step 1506. Accordingly, interpolation may expand the necessary portion of the rotated supertile 1400 beyond the portion that lies exactly on the chosen axes, with a corresponding expansion of the necessary portion of the unrotated supertile 1300.

Once pixel values along the axis are retrieved or calculated, an identifying step 1508 identifies a window whose position defines a set of reference pixels. Under one approach, the window is one pixel high and N pixels wide, where N is the number of pixels between the left edge 1402 (FIG. 14) and the origin 1404 of the rotated supertile 1400 along the axis. Although the window is one pixel high, the value of a given pixel in the window may reflect, through interpolation, the values of pixels above and below the axis. Of course, the reference position of the window could also be at the far right edge instead of the far left edge. Similar choices are available for the reference position of a window along the Y-axis when selecting the Y-period.

The pixels within the window at this reference position will be used as a reference as the window is repeatedly repositioned along the axis. The pixel values in the window at each successive position are compared with the reference pixels, either one-to-one or as a group, to locate the position of the window that gives the best fit in terms of seamlessness. In this way the period selecting step 1106 selects a period for each axis, with each period corresponding to the distance in pixels along the axis between the reference and best fit window positions.

Window and best fit criteria may be embedded in the software as defaults or read from configuration files at program start-up during a step 1510. Alternatively, the step 1510 may permit window and best fit criteria to be selected interactively by a user, or to be selected internally by software, after start-up. This allows the user or the software to search for an acceptable period accuracy by trying various window and best fit criteria.

The window and best fit criteria are selected implicitly or expressly during steps 1512 through 1520. During a tolerance choosing step 1512, a numeric tolerance is chosen. The tolerance will be used to determine if a pixel (or set of pixels) in the repositioned window are sufficiently close in value to the corresponding pixel (or set of pixels) in the reference. The smaller the tolerance, the more exactness is required for a seamless match. As one of skill in the art will understand, the nature of computer calculations is such that a tolerance of zero will rarely yield a match. Those of skill will readily identify a suitable range of tolerances for a given system, understanding that the tolerances will depend at least on the accuracy of numeric representations in the system, the degree of seamlessness required, the available computing time, and the available computing resources.

During a metric choosing step 1514, a metric for measuring the difference between pixels is chosen. One metric forms the difference between each pair of corresponding pixels (one pixel in the repositioned window and one reference pixel) and finds a best fit if the absolute value of every such difference at a given window location does not exceed the tolerance selected during step 1512. Another metric tests the absolute value of the difference of the squares of the pixels against the tolerance. Other metrics sum the differences (of pixels, or squares of pixels) and compare the sum to the tolerance. Still other metrics use a simple difference or difference of squares to form a function of the distance between the reference pixels and the pixels within the window's current position, and then function as a minimum-locating metric by seeking a minimum value of the function using familiar numerical analysis techniques.

During an offset choosing step 1516, a non-zero initial offset is chosen. This offset represents the distance between the initial (reference) position of the window and the next window position. The first test for a best fit is made by comparing pixels at the offset window position with pixels at the reference window position. The offset is preferably small relative to the window width N. Under one approach, the offset is one pixel; under another, the offset is one sampling increment.

During a slide increment choosing step 1518, a non-zero slide increment is chosen. This slide increment represents the distance between the offset position of the window and each successive position of the window until a period is selected or the window and best fit criteria are adjusted. The slide increment is preferably small relative to the window width N. Under one approach, the slide increment is one pixel; under another, the slide increment is one sampling increment.

The sampling increment is chosen during a step 1520. This is the distance between pixels within the window for purposes of applying the metric. For instance, if the sampling increment is three and the metric is a simple difference, then every third pixel in the repositioned window will be compared with its corresponding reference pixel and a best fit will be found if each such pair of pixels differs by no more than the tolerance.

During a positioning step 1522, the window is repositioned along the axis. If the last position was the reference position, then the repositioning will place the window at the initial offset. Otherwise, the position will move the window from its previous position by a slide increment number of pixels. During a comparing step 1524, the window pixel values at the new position are compared with corresponding reference pixel values, using the sampling increment, metric, and tolerance to measure the "distance" in appearance or an analogous aspect of seamlessness between pixels at the two locations.

If the measured distance in seamlessness is less than the tolerance, then the distance in pixels between the reference position and the current position is selected as the period during a step 1526. For instance, if the left edge of the window is twelve pixels away from the left edge 1402 of the reference window position, then the X-period is twelve. If a period has not already been selected for the other axis, then a repeating step 1528 is performed. The step 1528 may include the step 1502, or it may include some or all of the steps 1504 through 1524, 1530, and 1532. The same window and best fit criteria may be used for both axes, but different criteria may also be used on each axis.

If the window travels along the axis completely across the rotated supertile 1400 and no acceptable period is found, changes are made and some or all of the steps 1504 are repeated during a step 1530 and/or a step 1532. As indicated in FIG. 15, the step 1530 may include changing the tolerance, the metric, the initial window offset, the window slide increment, and/or the window sampling increment and then repeating the position/compare cycle until either a period is selected or the process once again runs out of window positions or some other constraint (e.g., low memory) mars comparison of corresponding pixel values. The step 1532 may include perturbing the rotational orientation (theta plus delta) of the rotated supertile 1400 by a small amount and then repeating steps 1504 onward. Alternatively, the step 1532 may involve repeating the step 1104 to generate a larger rotated supertile and then repeating steps 1504 onward.

Figure 16:
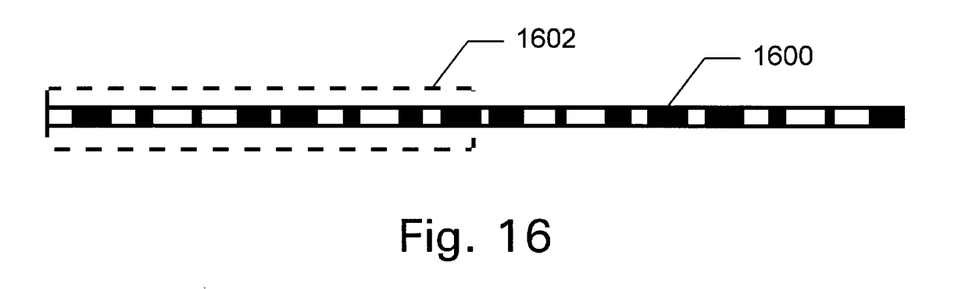
FIG. 16 shows a window in a reference position along an axis of a rotated supertile.
Figure 17:
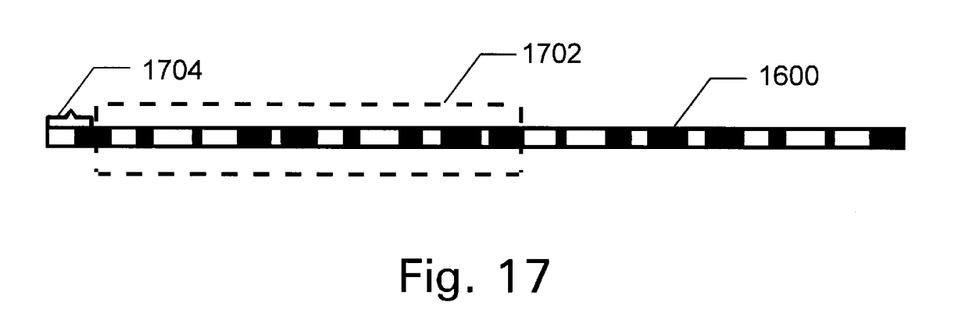
FIG. 17 shows the window of FIG. 16 at an initial offset position along the axis.
Figure 18:
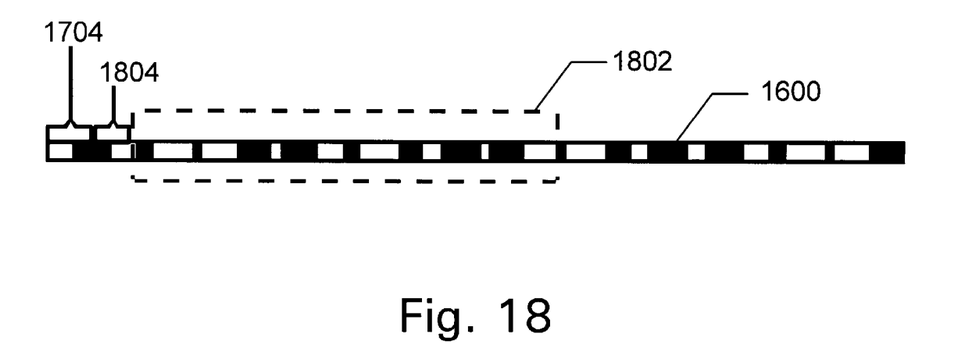
FIG. 18 shows the window of FIG. 17 repositioned from the initial offset by a slide increment.

FIGS. 16 through 21 further illustrate step 1106. FIG. 16 shows a row of pixels 1600 obtained during step 1504 and a window in the reference position 1602. FIG. 17 shows the window in an offset position 1702, offset from the reference position by an initial offset 1704. FIG. 18 shows the window after the positioning step 1522 is repeated, in a new position 1802 that differs from the position 1702 by a slide increment 1804.

Figure 19:
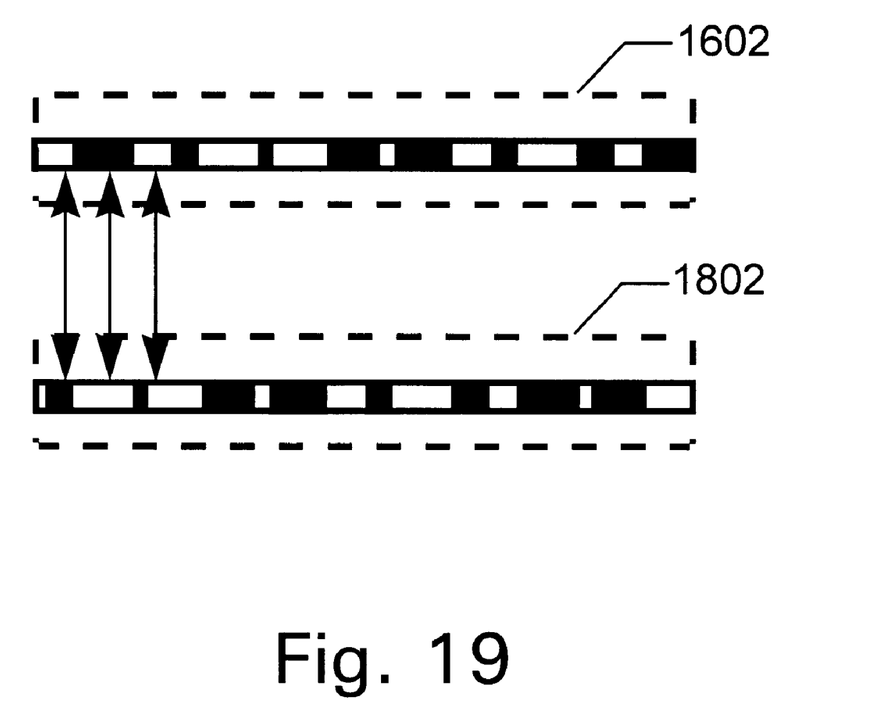
FIG. 19 indicates the correspondence between pixels in the FIG. 16 reference position of the window and pixels in the position shown in FIG. 18.

FIG. 19 indicates the correspondence between pixels in the reference window 1602 and pixels in the repositioned window 1802 for purposes of using the metric to measure the difference in seamlessness. For clarity of illustration, only three pairs of pixels are identified, but it will be understood that "corresponding" pixels are pixels which correspond in position relative to the boundaries of the respective windows 1602, 1802.

Once the periods of the axes are selected, the rotated textured tile is formed during the step 1108 (FIG. 11). If the rotated textured tile must be rectangular but need not be square, then the tile is a rectangle of dimension X-period by Y-period cut from the rotated supertile 1400 at coordinates defined by the window positions that gave rise to the periods. If a square rotated textured tile is required, then each of the tile's sides has a length equal to the Least Common Multiple (LCM) of the selected periods. If the LCM is too large, then the options described in connection with steps 1530 and 1532 may be pursued until periods which give rise to an acceptably small LCM are selected.

In summary, the present invention provides a system and method for producing rotated texture tiles that have horizontal and vertical sides and will tile seamlessly. Control is provided over the degree of seamlessness produced. Depending on the circumstances, the present invention may substantially reduce the amount of calculation required to realistically texture a rotated region, by avoiding calculations and rotations that are performed under other approaches.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform textured tile rotation and other operations according to the present invention.

Those of skill will appreciate that steps in methods of the invention may be omitted, performed in a different order, or performed concurrently, subject to the requirement that claimed steps cannot be omitted for purposes of literal infringement analysis, and that steps which depend on the results of other steps must be performed only after the required results are available.

Those of skill in the art will also recognize that an embodiment of the present invention need not include all parts of the architecture described above. The invention may be embodied in other specific forms without departing from its spirit or essential aspects. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for producing a rotated textured tile, comprising the computer-implemented steps of:

obtaining an initial textured tile from a memory, the initial textured tile having a length along a selected axis and a rotational orientation;

creating in memory a rotated supertile that contains repeated adjacent copies of at least part of the initial textured tile, the rotated supertile having a rotational orientation which differs from the rotational orientation of the initial textured tile by an arbitrary amount;

selecting a period within the rotated supertile using a processor, the period indicating the size of a repeated texture pattern in the rotated supertile along the selected axis; and using the selected period to produce the rotated textured tile in memory.

2. The method of claim 1, further comprising the step of displaying at least a portion of the rotated textured tile on a display device.

3. The method of claim 1, wherein the step of selecting a period further comprises the computer-implemented step of obtaining pixel values in the rotated supertile along the selected axis.

4. The method of claim 3, wherein the obtaining step comprises interpolating between pixel values.

5. The method of claim 3, wherein the step of selecting a period further comprises the computer-implemented steps of:

(a) creating a window containing a copy of the obtained pixel values;

(b) choosing a tolerance;

(c) choosing a nonzero initial offset;

(d) choosing a slide increment;

(e) positioning the window along the selected axis with an end of the window located at the initial offset from an edge of the rotated supertile;

(f) comparing the window pixel values at positions separated by the slide increment to the supertile pixel values at corresponding reference positions to determine whether all pairs of compared pixel values differ by more than the tolerance and then performing whichever of step (g) and step (h) applies in response to the determination;

(g) if no pair of compared pixel values differs by more than the tolerance, then selecting the distance traveled by the window from the edge of the rotated supertile as the period; and (h) if at least one pair of compared pixel values differs by more than the tolerance, then sliding the window along the selected axis by the slide increment and repeating step (f) and its successor steps until step (g) is performed or the sliding step results in a window position which mars comparison of corresponding pixel values.

6. The method of claim 5, wherein the window has a length which is at least the length of the initial textured tile along the selected axis.

7. The method of claim 5, wherein the window has a length which is an integer multiple of the length of the initial textured tile along the selected axis.

8. The method of claim 1, wherein the selecting step comprises perturbing the rotational orientation of the rotated supertile and then selecting a period within the perturbed rotated supertile.

9. A method for producing a rotated textured tile, the method comprising the computer-implemented steps of:

obtaining an initial textured tile from a memory, the initial textured tile having a length along an X-axis, a length along a Y-axis, and a rotational orientation;

creating in memory a rotated supertile that contains repeated adjacent copies of at least part of the initial textured tile, the rotated supertile having a rotational orientation which differs from the rotational orientation of the initial textured tile by an arbitrary amount;

selecting an X-period within the rotated supertile using a processor, the X-period indicating the size of a repeated texture pattern in the rotated supertile along the X-axis;

selecting a Y-period within the rotated supertile using a processor, the Y-period indicating the size of a repeated texture pattern in the rotated supertile along the Y-axis; and using the X-period and the Y-period to produce the rotated textured tile in memory.

10. The method of claim 9, further comprising the computer-implemented steps of cropping the rotated textured tile and then displaying the cropped rotated textured tile on a display device.

11. The method of claim 9, further comprising the computer-implemented step of displaying a plurality of copies of the rotated textured tile on a display device.

12. The method of claim 9, wherein the creating step creates a rotated supertile from four quadrants which are joined by two orthogonal axes.

13. The method of claim 12, wherein each quadrant in the rotated supertile contains a square integer number of adjacent rotated copies of the initial textured tile.

14. The method of claim 9, wherein the step of selecting an X-period further comprises the computer-implemented steps of:

(a) creating a window containing a copy of a plurality of pixel values of the rotated supertile along the X-axis;

(b) choosing an X-tolerance;

(c) choosing an X-axis slide increment;

(d) choosing a nonzero X-axis initial offset;

(e) positioning the window along the X-axis with an end of the window located at the initial offset from an edge of the rotated supertile;

(f) comparing the window pixel values at positions separated by the slide increment to the supertile pixel values at corresponding reference positions to determine whether all pairs of compared pixel values differ by more than the tolerance and then performing whichever of step (g) and step (h) applies in response to the determination;

(g) if no pair of compared pixel values differs by more than the tolerance, then selecting the distance traveled by the window from the reference position as the period; and (h) if at least one pair of compared pixel values differs by more than the tolerance, then sliding the window along the X-axis by the X-axis slide increment and repeating step (f) and its successor steps until step (g) is performed or the sliding step results in a window position which mars comparison of corresponding pixel values;

and wherein the step of selecting a Y-period further comprises steps corresponding to steps (a) through (h) but utilizing the Y-axis rather than the X-axis.

15. The method of claim 9, wherein the rotated textured tile is a square subtile of the rotated supertile.

16. The method of claim 15, wherein the using step further comprises finding the least common multiple of the X-period and the Y-period and the rotated textured tile has the least common multiple number of pixels along each side.

17. The method of claim 16, further comprising the computer-implemented steps of:

choosing a maximum dimension for the rotated textured tile;

determining that the least common multiple of the X-period and the Y-period exceeds the maximum dimension;

perturbing a parameter; and repeating the selecting steps until the least common multiple of the X-period and the Y-period does not exceed the maximum dimension.

18. The method of claim 17, wherein the perturbing step perturbs the rotational orientation of the rotated supertile.

19. The method of claim 17, wherein the perturbing step perturbs a tolerance used to determine whether pairs of compared pixel values differ when performing at least one of the selecting steps.

20. A system for texture manipulation, comprising a computer having a memory and a processor, an initial texture tile containing an unrotated texture, and means for using the memory and the processor to produce from the initial texture tile another tile which is a rotated texture tile in that it contains the texture in a rotated form capable of being seamlessly tiled.

21. The system of claim 20, wherein the means for producing the rotated texture tile includes means for producing at least a necessary portion of a rotated supertile.

22. The system of claim 21, wherein the means for producing the rotated texture tile includes means for selecting periods along axes of the rotated supertile.

23. The system of claim 22, wherein the means for selecting periods includes means for adjusting the rotated supertile.

24. The system of claim 22, wherein the means for selecting periods includes means for selecting and applying window and best fit criteria.

25. The system of claim 24, wherein the means for selecting periods further includes means for adjusting and reapplying the window and best fit criteria.

26. The system of claim 24, wherein the means for selecting and applying window and best fit criteria include choosing and applying a least squares metric to compare current pixels with reference pixels.

27. The system of claim 24, wherein the means for selecting and applying window and best fit criteria include choosing and applying a minimum-locating metric to compare current pixels with reference pixels.

28. A computer-readable storage medium having a configuration that represents data and instructions which cause a computer system to perform the texture manipulation steps of claim 1.

29. The storage medium of claim 28, wherein the medium is configured to perform the steps of claim 5.

30. The storage medium of claim 28, wherein the medium is configured to perform the steps of claim 8.

31. A computer-readable storage medium having a configuration that represents data and instructions which cause a computer system to perform the texture manipulation steps of claim 9.

32. The storage medium of claim 31, wherein the medium is configured to perform the steps of claim 14.

* * * * *